Dec. 6, 1966   G. E. MERRILL   3,289,415
METHOD AND APPARATUS FOR TRANSPORTING POTABLE
WATER TO RELATIVELY ARID AREAS
Filed Dec. 21, 1962   4 Sheets-Sheet 1
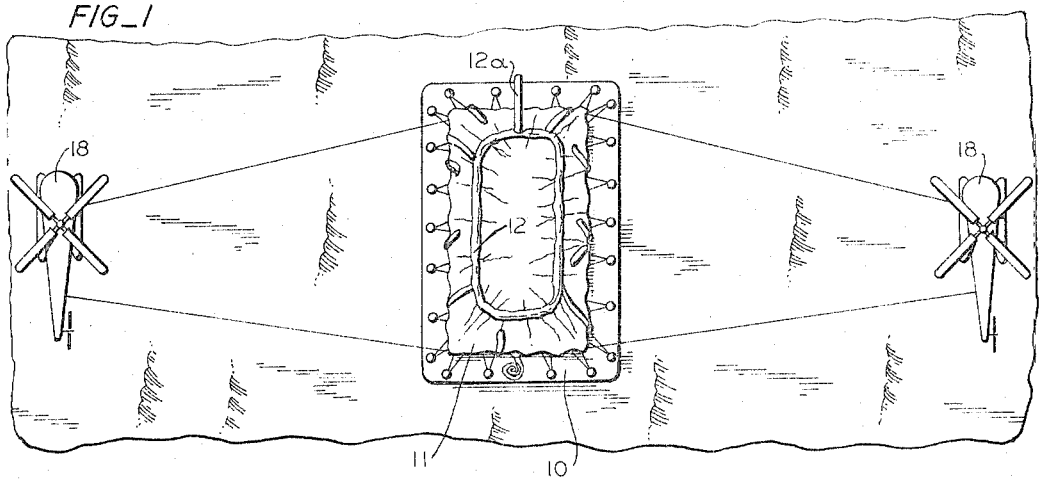
FIG_1
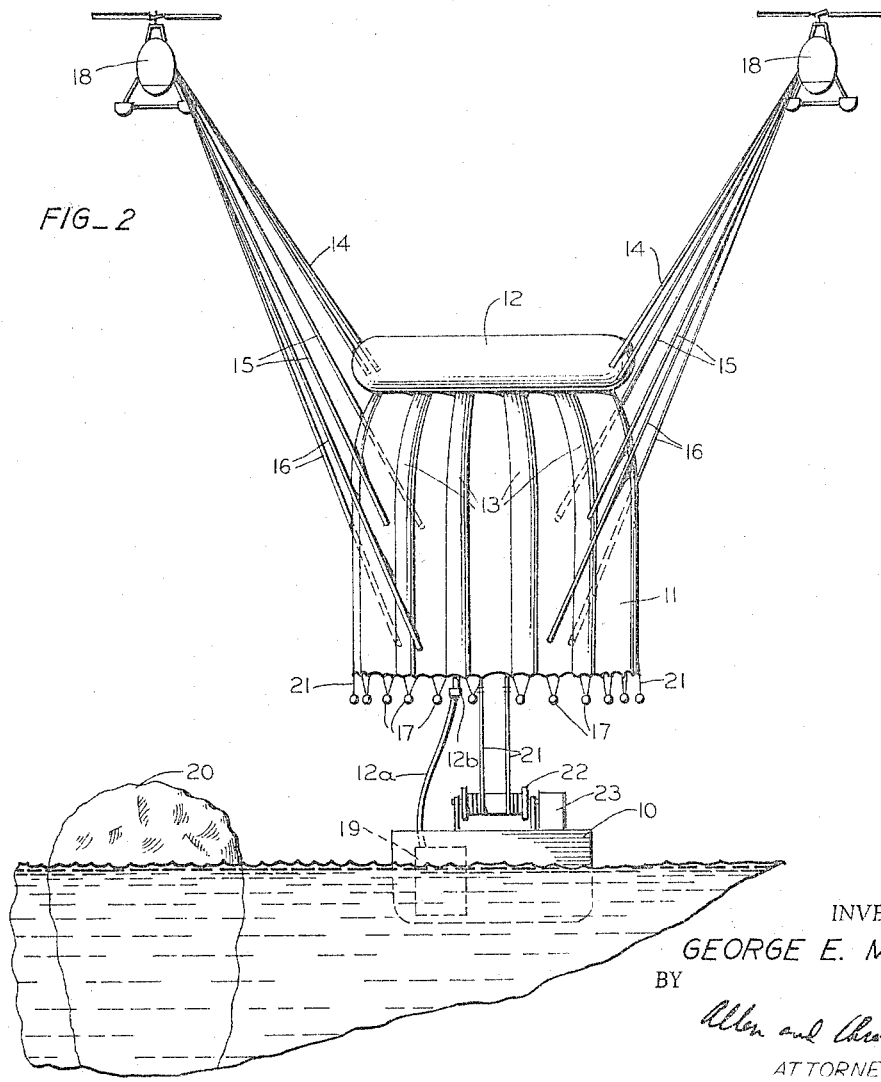
FIG_2
INVENTOR.
GEORGE E. MERRILL
BY
Allen and Chromy
ATTORNEYS

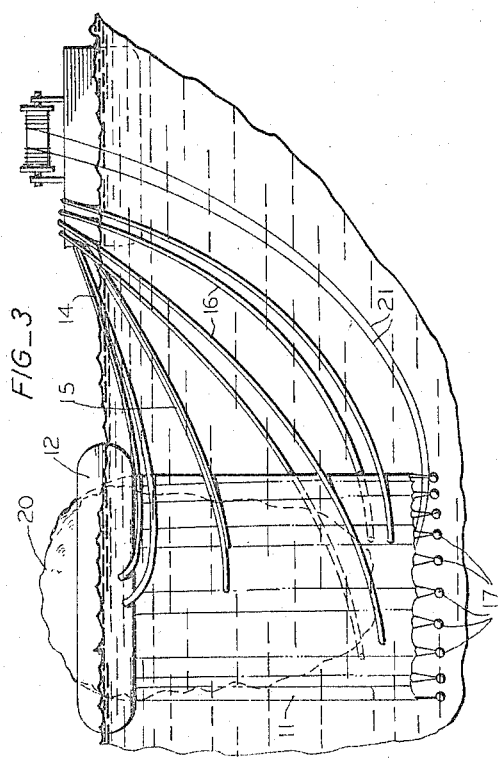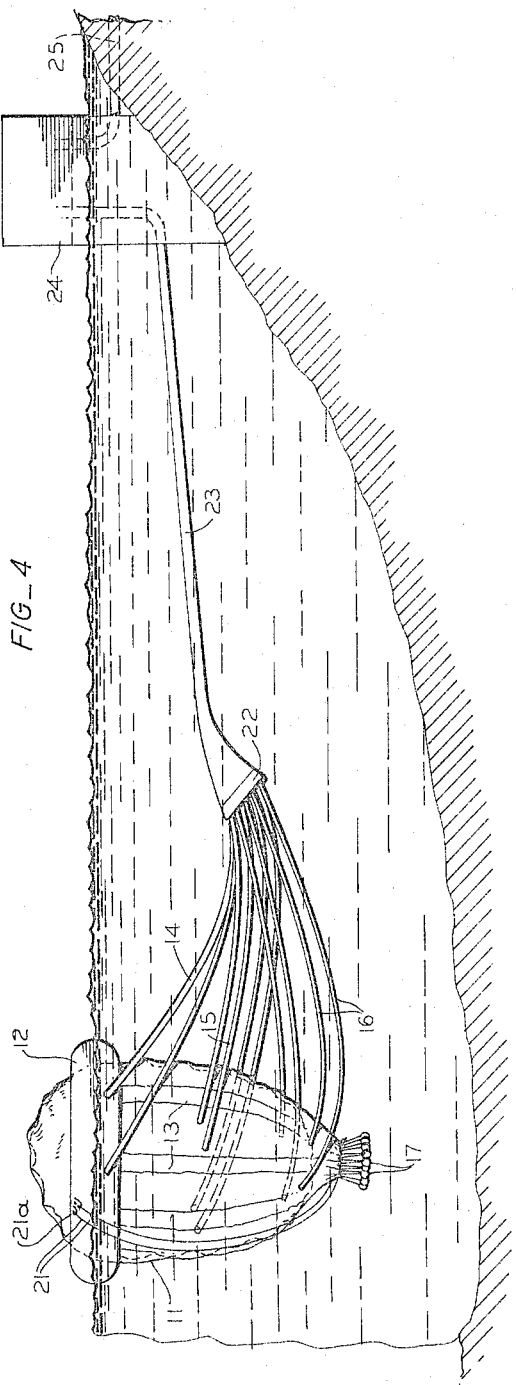

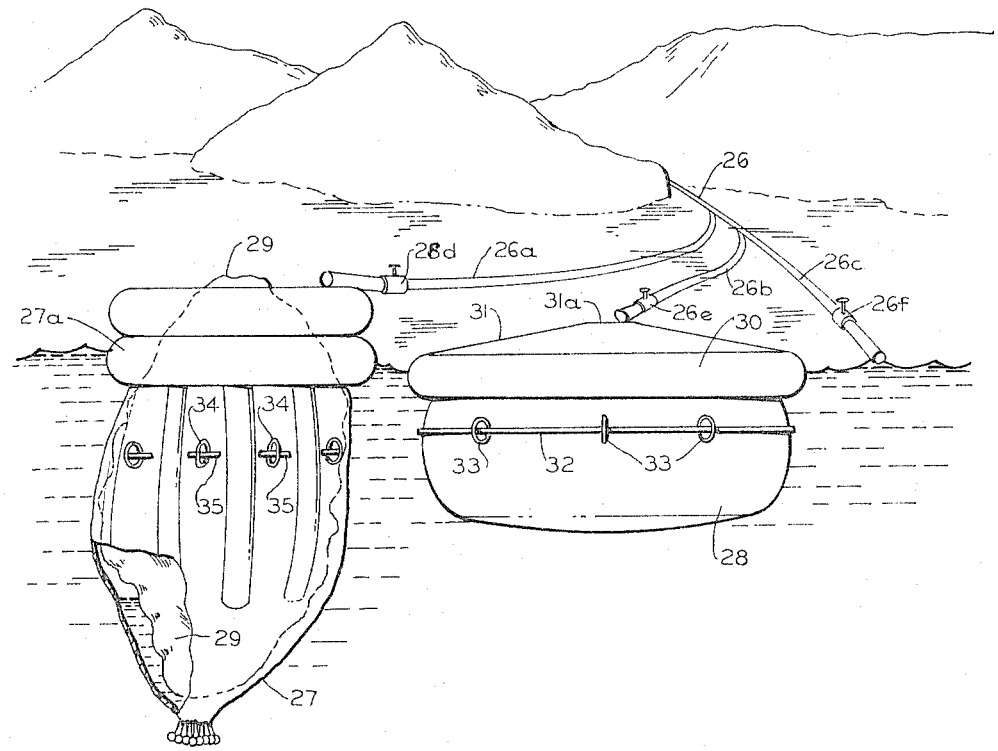
FIG_5
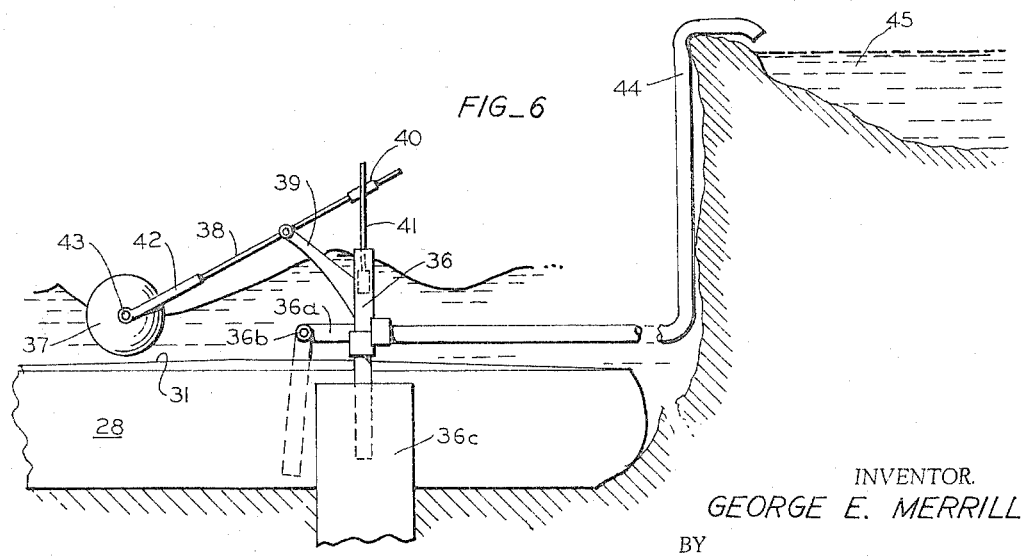
FIG_6
INVENTOR.
GEORGE E. MERRILL
BY
ATTORNEYS

Dec. 6, 1966    G. E. MERRILL    3,289,415
METHOD AND APPARATUS FOR TRANSPORTING POTABLE
WATER TO RELATIVELY ARID AREAS
Filed Dec. 21, 1962    4 Sheets-Sheet 4
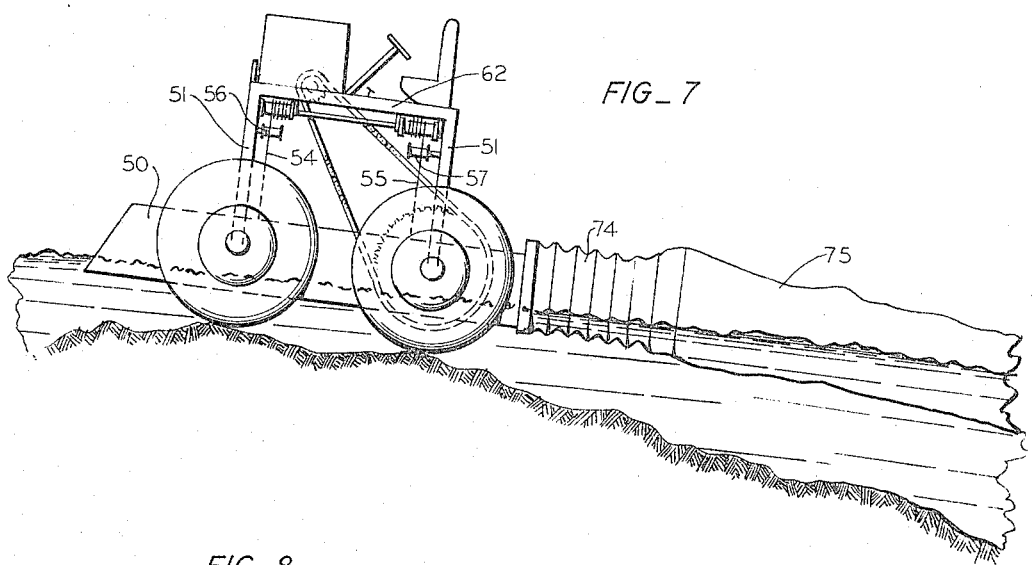
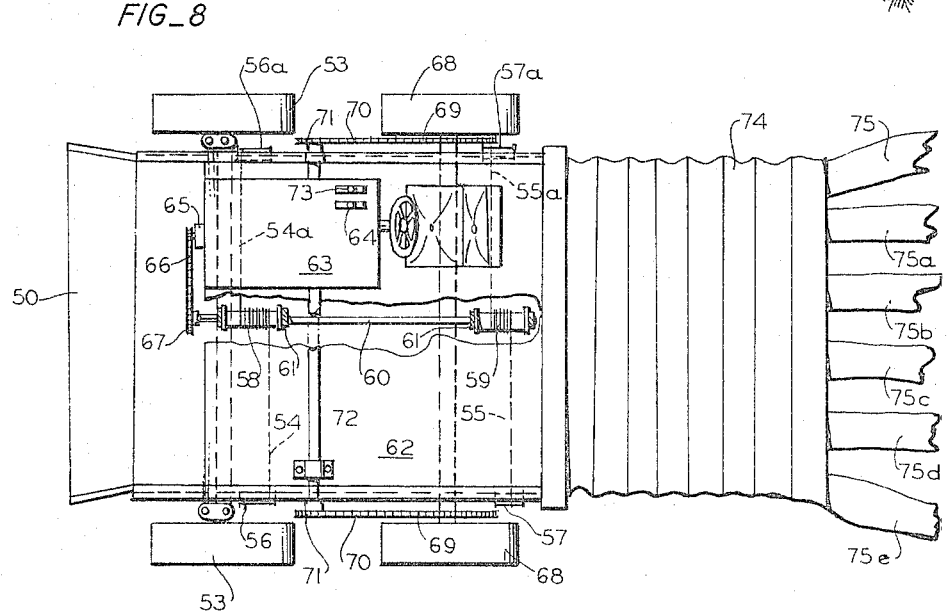
INVENTOR.
GEORGE E. MERRILL
BY
*Allen and Chromy*
ATTORNEYS Уnited States Patent Office 3,289,415
Patented Dec. 6, 1966

3,289,415
METHOD AND APPARATUS FOR TRANSPORTING POTABLE WATER TO RELATIVELY ARID AREAS
George E. Merrill, 5616 Croydon Ave., San Jose, Calif.
Filed Dec. 21, 1962, Ser. No. 246,461
5 Claims. (Cl. 61—1)

This invention relates to a method and apparatus for transporting potable water to relatively arid area or communities in such areas.

An object of this invention is to provide a method and apparatus for capturing potable water and transporting it to areas in need of such water supply.

Still another object of this invention to provide a method and apparatus by means of which fresh or potable water or ice masses, such as icebergs free in the northern latitudes of the oceans, are enclosed or wrapped in a suitable flexible blanket or bag of plastic or like sheet material and moved through the ocean to other parts of the earth where potable water is needed.

Still another object of this invention is to provide a method and apparatus for transporting relatively fresh or potable water by capturing such water at the mouths of streams emptying into the ocean in areas of relatively heavy rainfall and transporting the captured water over the ocean to the proximity of areas in which such water may be needed and/or may be in short supply, such as highly populated areas or desert areas, and pumping such water by means of pumps actuated by wave motion through piping such as plastic pipes which are laid to carry the captured water to the wave actuated pumps and areas where the water is to be utilized or stored for future utilization.

Still another object of this invention is to provide a means such as a plastic bag for capturing relatively pure or potable water which may be in the form of an iceberg or which may be supplied to the bag from a stream emptying into the ocean, said bag of captured water being adapted to be hauled or moved over the ocean surface by the buoying action of the salt water of the ocean as the bag and water are towed to the proximity of areas where the water is to be utilized.

Other and further objects of this invention will be apparent to those skilled in the art to which it relates from the following specification, claims and drawings in which briefly:

FIG. 1 is a plan view showing a pair of helicopters lifting a bag off of a barge preparatory to placing said bag over an iceberg FIG. 2 is a view in side elevation showing the bag lifted off of the barge and having the ribs and crown thereof being inflated preparatory to maneuvering the bag over the iceberg FIG. 3 is a view showing the bag around the iceberg with the mooring lines which are in the form of plastic pipes or tubing detached from the helicopters;

FIG. 4 shows the iceberg with the plastic pipes attached to the bag coupled to the water evacuating line which is connected to a wave actuated pump;

FIG. 5 is a view showing plastic bags for capturing an iceberg and liquid potable water which is supplied thereto from a pipeline leading to a fresh water stream;

FIG. 6 is a side view of a wave pump connected to the top of a plastic bag holding the supply of potable water and positioned so that the water contents thereof may be pumped into a reservoir FIG. 7 is a side view of a tractor for transporting a funnel upstream so that the funnel may receive fresh water from the stream and guide the water to a plastic pipe system which is to be connected to water transporting bags and FIG. 8 is a plan view of the tractor and funnel shown in FIG. 7.

Referring to the drawings in detail, reference numeral 10 designates a flat top barge on which the collapsed bag 11 made of plastic sheet material is adapted to be used for enclosing the iceberg 20. This plastic sheet bag 11 is provided with a hollow donut-shaped crown 12 which is attached to the upper part thereof and which encircles the upper open part of the bag. The bag 11 is also provided with inflatable ribs 13 which extend up and down the length thereof and which are connected to the crown 12 so that these ribs and the crown may be inflated at the same time. A plurality of weights 17 is provided to the bottom of the bag and these weights are attached by means of a suitable rope or cord 21 to the bottom. The donut-shaped crown 12 and the ribs 13 are inflated through a plastic hose 12a which is connected between the crown 12 and the compressor 19 that is located in the barge 10. The upper part of the plastic hose 12a may be cemented to the outside of the bag 11. Also this hose is provided with a coupling 12b for separating the upper part thereof from the lower part after the crown 12 and ribs 13 are suitably inflated. This coupling 12b is provided with a suitable check valve of conventional construction which closes the hose 12a and prevents the gas from escaping the crown 12 and ribs 13 unless this check valve is released by the operator.

Suitable plastic hoses 14, 15 and 16 are also cemented or otherwise attached to the bag 11. The hoses 14 penetrate the bag 11 and connect to the inside near the top thereof, and the hoses 15 connect with the inside of the bag around the middle part, while the hoses 16 connect with the inside of the bag near the bottom thereof. These hoses have several functions. One function is to enable the two helicopters 18 to raise the bag after it is inflated and the crown 12 and ribs 13 assume an erect position so that the helicopters 18 to which the hoses 14, 15 and 16 are attached can raise the bag as show in FIG. 2. The coupling 12b is then separated so that the bag may be moved by the two helicopters over the iceberg 20 and dropped thereover.

After the iceberg bag 11 is maneuvered over the iceberg by the helicopters 18, it is lowered down so that it assumes the position shown in FIG. 3. The helicopters are then flown over the barge 10 and the hoses 14, 15 and 16 are detached from the helicopters and attached by means of suitable hooks (not shown) to the barge for use in towing of the captured iceberg 20 to a southern latitude where the iceberg 20 is allowed to melt by the heat received from the sun to supply fresh or potable water.

The lines 21 which are threaded through the bottom of the bag and hold the weights 17 are then pulled in by the winch 22 by the motor and gear mechanism 23 which is of conventional construction. The taut lines 21 are pulled over the top of the captive ice and attached to hooks 21a. Suitable knots may be provided in the line 21 so that the weights 17 do not drop down more than a predetermined distance.

Thus after the bag 11 is dropped over the iceberg, the winch 22 is operated to tighten up on the cord or rope 21 so as to bring the bottom of the bag more or less snugly around the bottom of the iceberg and also to expel whatever salt water from the ocean there might have been enclosed in the bottom part of the bag. The weights 17 are then held together in a clump, as shown in FIG. 4, and the ends of the rope 21 may be attached to suitable hooks 21a provided at the top of the member 12 so as to keep the bottom of the canopy tightly drawn.

After the bag is draped over the iceberg and the bottom is closed by drawing the rope 21 tight so that the periphery of the bottom of the bag is gathered together, the iceberg and bag draped thereover are ready to be towed by the tow boat which may be the barge 10 provided with a conventional propeller and engine for driving same. In towing the draped iceberg, the plastic hoses 14, 15 and 16 are firmly attached to the towing barge 10 by means of suitable clamping devices attached thereto so that the plastic hoses 14, 15 and 16 also function as tow lines. Thus the towing pull is distributed over the surfaces of the draping bag 11 inasmuch as the hoses 14, 15 and 16 are attached to different parts of the circumference of the bag.

After the captured iceberg is towed to a warmer latitude where it is desired to convert the ice into a usable supply of potable water, the hoses 14, 15 and 16 are each attached to a suitable coupling 22 of a pipe line 23 which may also be made of suitable plastic material, as shown in FIG. 4. Each opening in the coupling 22 is provided with a suitable threaded member and also with a valve which is opened manually when the hose from the bag is attached thereto. The ends of the hoses 14, 15 and 16 are also provided with threaded members which are adapted to be received by the threaded members on the coupling 22 so that these hoses may be firmly attached to this coupling. The valves in this coupling member 22 may be automatic check valves oriented so that water may be drawn from the bag 11 through these hoses into the pipe 23 by the pumping apparatus 24. These valves may of course be manually opened by the diver when he couples the hoses 14, 15 and 16 to the coupling member 22, and also they may be closed by the diver when the hoses are decoupled. Furthermore, the coupling member 22 may have provision thereon for receiving coupling members from hoses of several bags, such as the bag 11, whereby water may be drawn off of one or more melting icebergs or bags of water at the same time.

The pumping station 24 is provided with one or more pumps which may be driven by various forms of power. For example, this pumping station may be equipped with one or more wave actuated pumps which may be of conventional construction, or it may be provided with pumps driven by gas engines or electric motors if desired. Thus the water is pumped out of the bag 11 as the iceberg melts and into the pipe line 25 by the pumping apparatus, and from the pipe line 25 it is supplied to a reservoir such as a lake, a tank or other water storage located on land where the water is to be used.

In FIG. 5 there is shown an arrangement employing a pipe line 26 having several outlet branches 26a, 26b and 26c for piping fresh or potable water from an inland stream near the coast to water transporting bags, such as the bags 27 and 28, which may be made of a suitable durable plastic sheet material. The bag 27 is similar to the bag 11 previously described, and it is shown draped around an iceberg 29. The branch pipe line 26a which is connected to the principal line 26 is provided with a manually operable valve 26d and is arranged so that fresh water may be fed therethrough into the bag 27 around the iceberg 29 so that this iceberg is surrounded by fresh water and the bag assumes a more or less rounded configuration. In other words, the bag is separated from the edges of the iceberg and wear on the bag is thus reduced.

The bag 28 is also made of plastic and in this case the plastic is of a semi-rigid form so that the bag tends to assume a certain shape, although when it is not filled with water it collapses. However, if desired, a suitable framework made up of tubular members which may also be made of plastic may be provided inside of this bag so that it maintains a predetermined shape even when not filled with water. This bag is also provided with a donut-shaped crown 30 attached to the top thereof that is pumped full of air so that it is maintained erect around the top of the bag 28. This also acts as a fender and prevents high waves from engulfing the top of the bag 28.

The bag 28 is also provided with a cover 31 which slopes toward the edges so that ocean spray drains down to the inflated crown 30. A hole 31a is provided in the center at the apex of the cover 31 through which water is supplied to the inside of the bag 28 through the pipe line 26d and valve 26e. A suitable cover may be attached to the lip of the opening 31a after the bag 28 is full so that ocean spray does not get inside of the bag and contaminate the fresh or potable water inside. Likewise, a suitable cover may also be draped over the top of the iceberg 29 that it is enclosed in the bag 27, and the edges of this cover may be attached to the top of the inflated member 27a which may be provided with suitable buckles for receiving straps attached to the cover.

After the bags 27 and 28 are supplied with the fresh water, suitable tow lines are attached thereto for towing the bags to the pumping stations located at the areas where the water is to be used. Suitable rings 33 are attached to the bag 28 by the rope 32 which is cemented to the outside of the bag and thus the rings 33 are held on the bag in spaced apart positions and the pulling force of the different tow lines attached to these rings is distributed around the outer area of the bag. Similar tow rings 34 are attached to the outside of the bag 27 by means of straps 35 which are cemented to the outside of the plastic bag.

A wave actuated pump is shown in FIG. 6 for pumping the potable water out of one of the bags such as the bag 28 after said bag is towed to the utilizing area. The pump 36 is anchored to the concrete pier 42 which is positioned on the bottom of the ocean floor near the shore so that the float 37 of the wave pump 36 is located on the water surface and is moved up and down as the waves proceed toward the shore. The bag 28 full of potable water is moved along side of the pump and the pump inlet 36a is swiveled into the inside of the tank through the top opening 31. For this purpose the pump inlet 36a is provided with a swivel joint 36b which acts as a pivot around which the end part of this inlet may be tilted. On the other hand, the inlet may be made of flexible or corrugated pipe so that it may be manipulated into the bag opening.

The wave pump 36 is provided with a piston rod 41 extending out of the top thereof and a sleeve 40 is pivotally attached to the top part of this piston for slidably receiving the outer end of the rod 38. The rod 38 is pivotally attached to the bracket member 39 which is integral with the frame of the pump and functions to support the arm 38 thereon. A suitable U-shaped member 42 is provided to the rod 38 and this member is attached by pivots 43 to the opposite sides of the float 37.

In FIGS. 7 and 8 there is illustrated a mobile apparatus for moving the intake of the fresh water piping system upstream. The water trough 50 is supported between the upright members 51 of the tractor by means of the cables 54, 54a, 55 and 55a. These cables are adapted to be wound upon the winches 58 and 59 which are supported on the shaft 60. The shaft 60 is provided with suitable bearings 61 that are attached to the bottom surface of the platform 62 of the tractor. The shaft 60 of the winches 58 and 59 is provided with a sprocket wheel at the forward end thereof which is engaged by the chain 66 that is driven by the sprocket 65 of the internal combustion engine 63. A suitable gear arrangement is provided to the shaft of the sprocket 65 (not shown) and this gear arrangement may be either engaged or disengaged from the shaft of the engine by manipulating the hand lever 64. This arrangement is of conventional construction and is employed when it is desired to drive the sprocket 65 so that the chain 66 may be driven during the raising or lowering of the water guide or funnel 50. For this purpose, the cables 54 and 55 are wound onto or paid out of the winches 58–59 respectively at the top thereof, and the cables 54a and 55a are wound onto or paid out of the winches 58–59 respectively at the bottom thereof. Thus all of the cables 54, 54a, 55 and 55a cooperate in the lowering or raising of the water funnel 50. Suitable pulleys 56, 56a, 57 and 57a are attached to the sides of the upright members 51 and these function to guide the cables during the raising or lowering of the water funnel.

The front wheels 53 of the tractor may be mounted with the axles thereof on conventional vertical pivots and they may be operated by means of a suitable linkage that is attached to the steering wheel 53a of the tractor whereby the front wheels may be turned to provide for steering of the tractor. The rear wheels 68 of the tractor are provided with sprockets 69 which are fixedly attached thereto. Sprocket chains 70 which are positioned on these sprockets and also on the driving sprocket 71 are employed for driving the rear wheels of the tractor mechanism from the drive shaft 72 of the gas engine 63. A conventional control lever 73 that is adapted to be manipulated by the operator is provided for connecting the drive shaft 72 to the engine 63.

The water funnel 50 is connected by means of the plastic pipe to a plurality of pipe lines 75–75e which extend to the ocean shore and some distance beyond, as shown in FIG. 5, so that the fresh water from the funnel arrangement is supplied to the bags 27 and 28, etc.

This invention makes use of the fact that the potable water enclosed in the bags 11, 27 and 28 has a lower specific gravity than the salt water of the ocean so that these bags, when filled with potable water, whether it be in the form of ice or liquid, will float on or near the surface of the ocean. Also in transporting or towing the water filled bags over the ocean, the bags may be arranged in groups and each group towed by one tug boat. Furthermore, the bags for liquid water may be made of considerable area, for example several acres, having a depth on the order of a hundred feet. These may be provided with apertured crossing partitions to give the bag added strength and the top of the bag may be provided with a cover such as the cover 31 shown in FIG. 5, together with one or more openings 31a for filling the bag.

While I have shown a preferred embodiment of the invention it will be understood that the invention is capable of variation and modification from the form shown so that its scope should be limited only by the scope of the claims appended hereto.

I claim:

1. A method of delivering potable water comprising the steps of providing a bag of impervious sheet material with an open bottom, substantially enclosing a mass of ice in the ocean body of water in said bag through said open bottom, supplying potable water through the top of said bag to expel the ocean water captured with said mass of ice through said open bottom, closing said open bottom, floating the bag and enclosed ice and water on said ocean body by virtue of the lower specific gravity of the bag and enclosed ice and water than the specific gravity of the ocean water, towing the bag with enclosed ice and water on said ocean body to the proximity of an area where the ice and water is to be used, melting the ice in said bag, attaching the bag to a pipe line leading to a pump, driving the pump to pump the potable water out of the bag and into a reservoir in the proximity of the area where the water is to be used.

2. A method of delivering potable water comprising the steps of providing a bag of impervious sheet material with an open bottom, inflating parts of the bag so that it assumes an open shape, substantially enclosing a mass of ice in an ocean body of water in said bag through said open bottom, drawing the bottom edges of said bag together, floating the bag and enclosed mass of ice on said ocean body by virtue of the lower specific gravity of the bag and enclosed ice than the specific gravity of the ocean water, towing the bag with enclosed ice on said ocean body to the proximity of an area where the ice is to be used, melting the ice in said bag to form potable water, attaching the bag to a pipe line leading to a pump, driving the pump to pump the potable water out of the bag and into a reservoir in the proximity of the area where the water is to be used.

3. A method of delivering potable water comprising the steps of providing a bag of impervious sheet material with an open bottom, draping the bag around a quantity of ice such as an iceberg, running potable water into said bag around the ice, closing the open bottom of said bag, floating the bag and enclosed water on an ocean body of water by virtue of the lower specific gravity of the bag and enclosed water than the specific gravity of the ocean water, towing the bag with enclosed water on said ocean body to the proximity of an area where the ice melts and the water is to be used, melting the ice in said bag, attaching the bag to a pipe line leading to a pump, driving the pump to pump the potable water out of the bag and into a reservoir in the proximity of the area where the water is to be used.

4. A method of delivering potable water comprising the steps of providing a bag of impervious sheet material with an open bottom, lowering said bag over a mass of ice in an ocean body of water representing a quantity of water in potable form in said bag, drawing the edges of the open bottom of said bag together, floating the bag and enclosed water on said ocean body by virtue of the lower specific gravity of the bag and enclosed water than the specific gravity of the ocean water, towing the bag with enclosed water on said ocean body to the proximity of an area where the water is to be used, melting the ice in said bag, attaching the bag to a pipe line leading to a pump, providing a float to the pump, driving the pump by the action of ocean waves on the float to pump the potable water out of the bag and into a reservoir in the proximity of the area where the water is to be used.

5. Apparatus for delivering potable water comprising a bag of impervious sheet material, a water funnel and a pipe line connected thereto, a tractor, said funnel being movably supported by said tractor, said tractor transporting said funnel upstream from an ocean shore and lowering said funnel into a stream to supply water from said stream to said funnel and said pipe line, outlet being positioned to supply a quantity of water in potable form to fill said bag, towing lines attached to said bag for towing said bag with enclosed water on the ocean to the proximity of an area where the water is to be used, said towing lines comprising plastic pipes connecting said bag to a pipe line, a pump connected to said pipe line, means for driving said pump to pump the potable water of the bag and into a reservoir in the proximity of the area where the water is to be used.

References Cited by the Examiner

UNITED STATES PATENTS

| 1,023,759 | 4/1912 | Rectenwald | 244—31 |
| 2,287,824 | 6/1942 | Pihl et al. | 114—74.1 |
| 2,391,926 | 1/1946 | Scott | 61—5 X |
| 2,679,224 | 5/1954 | Sturtevant | 244—31 X |
| 2,697,442 | 12/1954 | Anschultz | 114—.5 |
| 2,854,049 | 9/1958 | Wyllie | 114—.5 |
| 3,067,712 | 12/1962 | Doerpinghaus | 61—5 |
| 3,108,440 | 10/1963 | Anderson | 61—29 |

FOREIGN PATENTS

| 2,428 | 1866 | Great Britain. |

EARL J. WITMER, *Primary Examiner.*